(12) United States Patent
Potekev

(10) Patent No.: US 7,300,164 B2
(45) Date of Patent: Nov. 27, 2007

(54) MORPHING LIGHT GUIDE

(75) Inventor: Franc Potekev, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 345 days.

(21) Appl. No.: 10/928,958

(22) Filed: Aug. 26, 2004

(65) Prior Publication Data

US 2006/0044531 A1   Mar. 2, 2006

(51) Int. Cl.
*G03B 21/00*   (2006.01)

(52) U.S. Cl. ........................... 353/122; 362/551

(58) Field of Classification Search ............ 353/84, 353/102, 122; 362/551, 31, 133, 146; 385/146
See application file for complete search history.

(56) References Cited

U.S. PATENT DOCUMENTS

| | | | |
|---|---|---|---|
| 4,730,895 A | 3/1988 | Siedband et al. | |
| 5,317,484 A | 5/1994 | Davenport et al. | |
| 5,634,704 A * | 6/1997 | Shikama et al. | 353/31 |
| 5,699,201 A | 12/1997 | Lee | |
| 5,709,463 A | 1/1998 | Igram | |
| 5,810,469 A | 9/1998 | Weinreich | |
| 5,838,865 A | 11/1998 | Gulick et al. | |
| 5,842,767 A | 12/1998 | Rizkin et al. | |
| 5,871,266 A | 2/1999 | Negishi et al. | |
| 5,884,991 A | 3/1999 | Levis et al. | |
| 5,903,091 A | 5/1999 | MacLennan et al. | |
| 6,005,722 A | 12/1999 | Butterworth et al. | |
| 6,123,436 A | 9/2000 | Hough et al. | |
| 6,129,437 A | 10/2000 | Koga et al. | |
| 6,139,156 A * | 10/2000 | Okamori et al. | 353/98 |
| 6,224,216 B1 * | 5/2001 | Parker et al. | 353/31 |
| 6,384,320 B1 | 5/2002 | Chen | |
| 6,739,723 B1 * | 5/2004 | Haven et al. | 353/20 |
| 6,926,413 B2 * | 8/2005 | Akiyama | 353/122 |
| 7,052,150 B2 * | 5/2006 | Dewald | 359/856 |

FOREIGN PATENT DOCUMENTS

| | | |
|---|---|---|
| EP | 0736415 | 10/1998 |
| WO | WO 02/086610 | 10/2002 |
| WO | WO 02/086617 | 10/2002 |

* cited by examiner

*Primary Examiner*—Christopher Mahoney
(74) *Attorney, Agent, or Firm*—Timothy F. Myers

(57) ABSTRACT

A morphing light guide has a body with a consistent cross-sectional area that extends from an entry aperture with a first geometric shape to an exit aperture with a different second geometric shape.

30 Claims, 9 Drawing Sheets

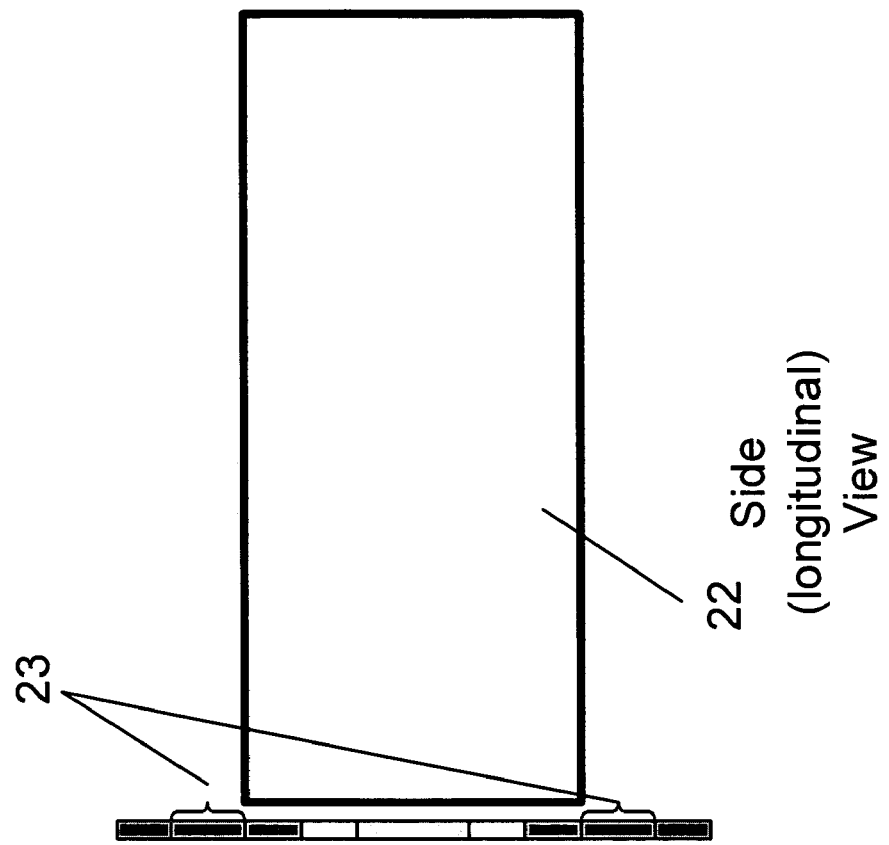
Fig. 2B -- PRIOR ART --
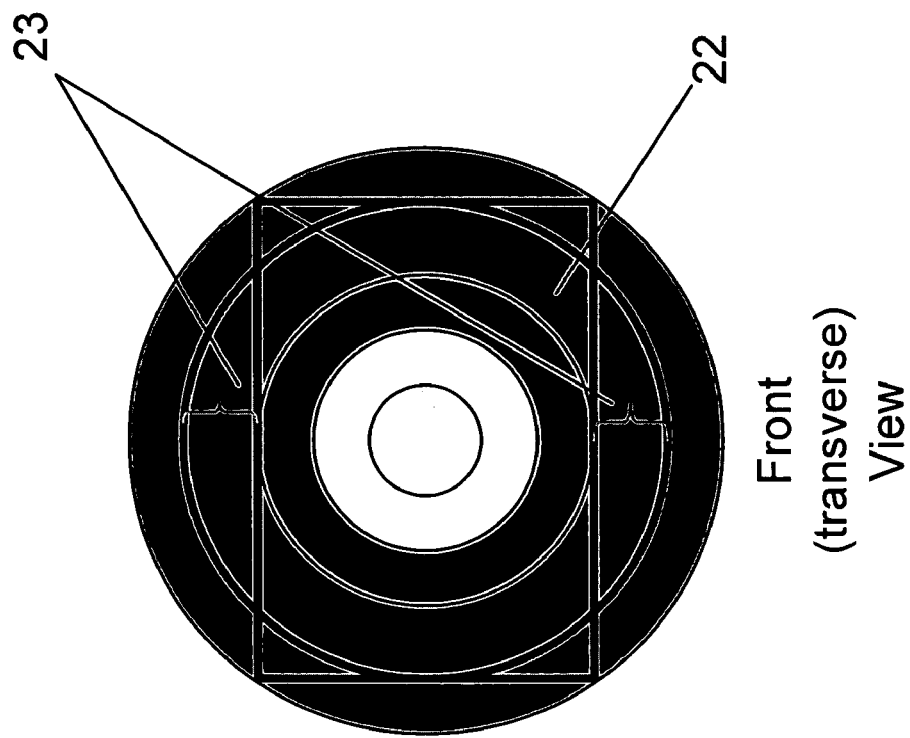
Fig. 2A -- PRIOR ART --

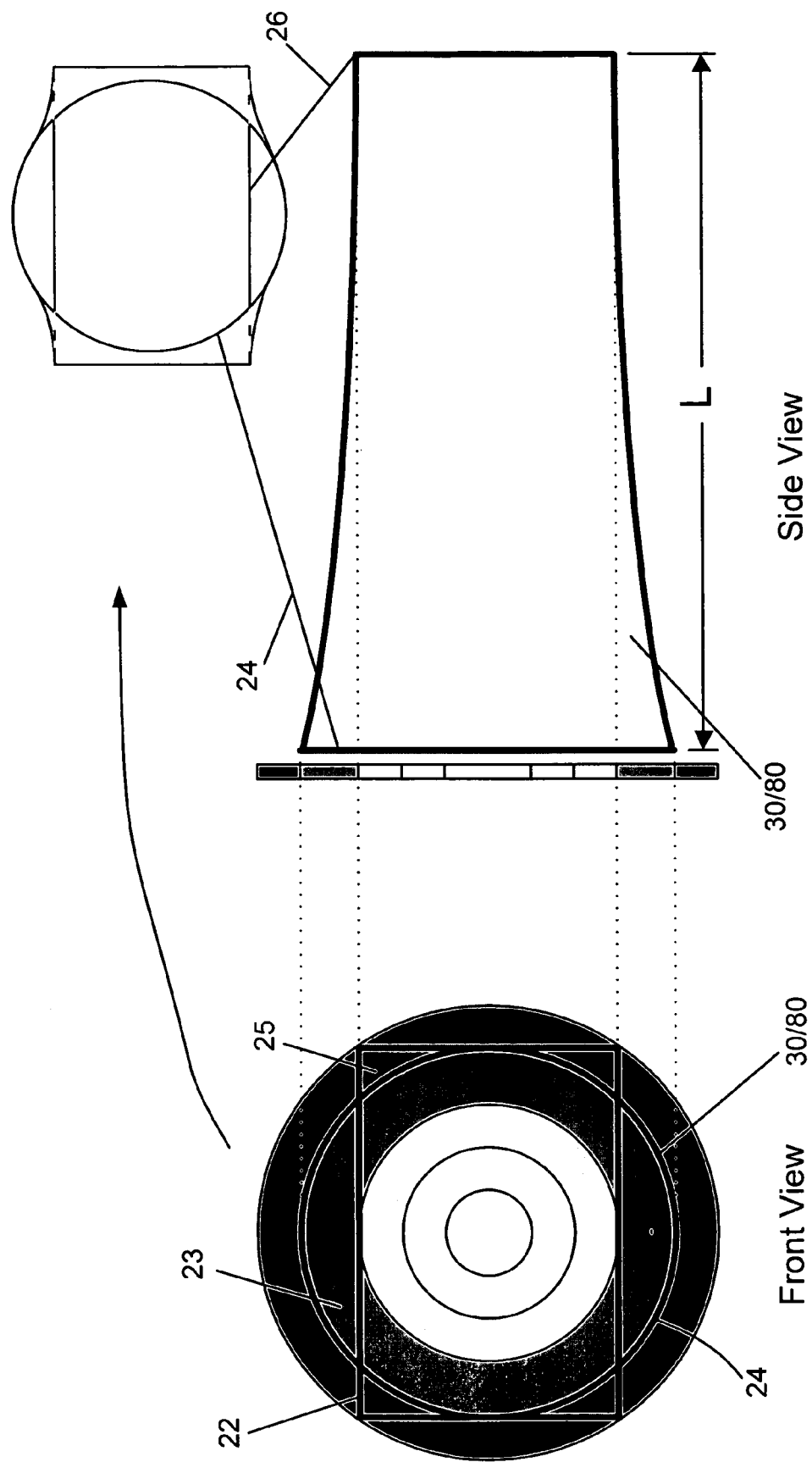
Fig. 3B Side View
Fig. 3A Front View

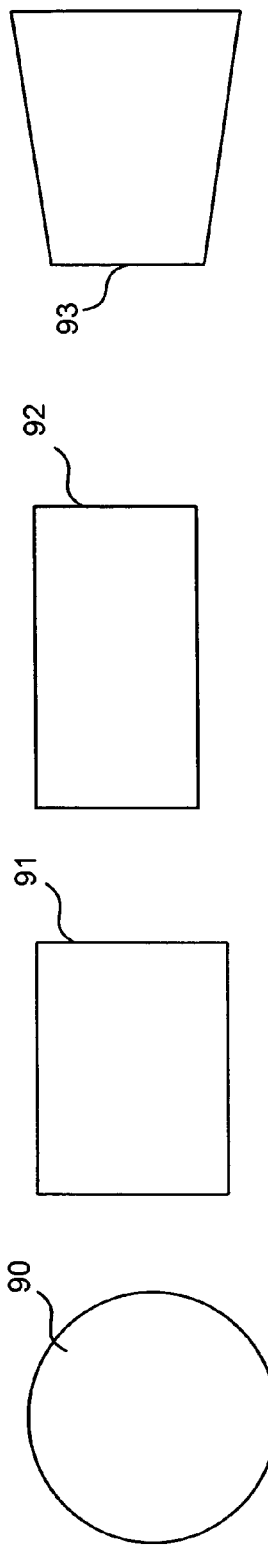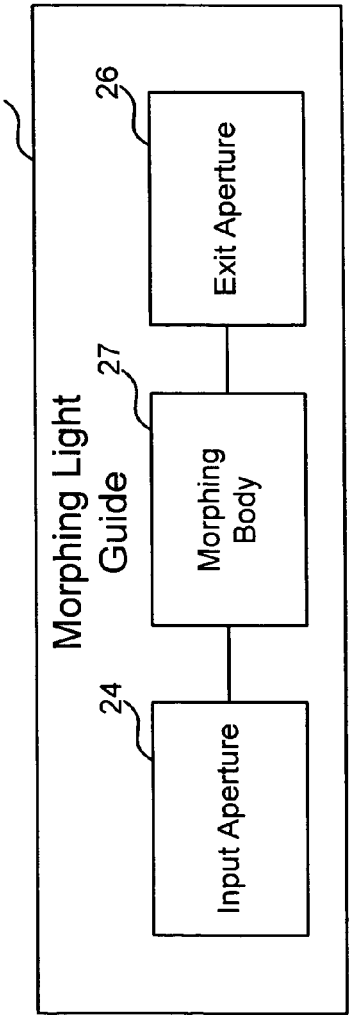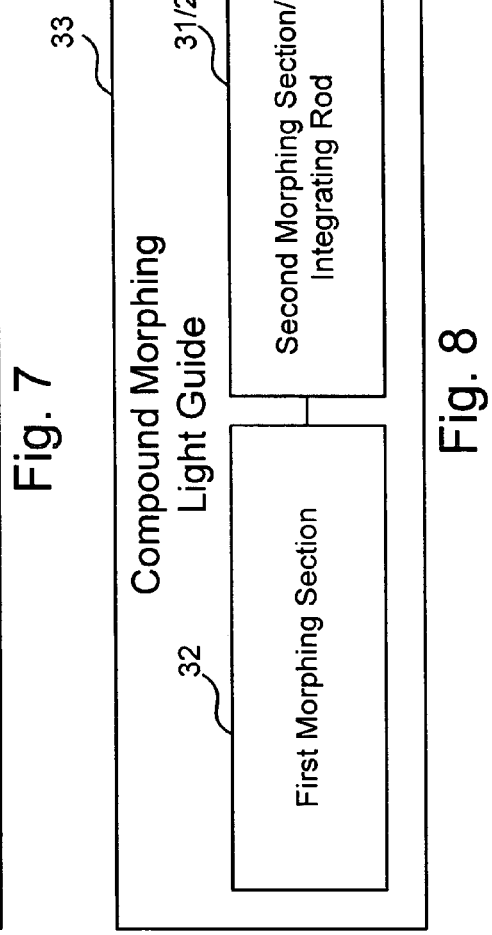

End View

Perspective View

MORPHING LIGHT GUIDE

BACKGROUND

A typical projection system includes an arc-lamp source of bright white light, a method for separating the white light into red, green and blue spectral components, and a spatial light modulator (SLM, also called a light valve) for two dimensional imaging each of the spectral components to create a color picture. The SLM performs the spatial and temporal modulation in response to an analog or digital video signal generated by a computer or another video source such as a TV tuner, VCR, HDTV broadcast, or DVD player. The SLM typically creates sequential images in red, green, and blue color planes although other color separation techniques exist such as cyan, yellow, magenta, and optionally white planes. The color planes may then be recombined optically and projected onto a screen, or they may be flashed temporally in sequence onto the screen at such a rate that a viewer perceives only a single image.

Most digital projectors compete based on the number of screen lumens that the projector places on the projection screen. Although the competition in the projector market is fierce, cost considerations as well as size constraints have limited the development of more efficient optical designs for other light sources.

Most conventional small projector systems have total optical system efficiency from bulb to screen of less than 12%. That is, only up to 12% of the light created by the bulb actually exits from the projection optics and makes it to the screen. This inefficient design results in not only a dimmer display but also the consumption of needlessly wasted power. Several approaches have been attempted to increase the efficiency but with little success.

For instance, if an integrating rod is increased in size to gather more of the beam from the lamp focus then the magnification of the illumination system must be changed. Changing the magnification of the illumination system requires changes in optical path length of the system and the effective focal length of the lenses used in the system. These changes may or may not be practicable in products with small profiles or even in large profile digital projectors. Therefore, the need to capture more light from the lamp focus and couple it into the same size integrating rod with increased luminance is desired in all digital projectors.

In addition, there are several problems with existing arc-lamp sources. The most commonly used lamp source is a mercury vapor arc lamp. This lamp produces the most light for a given wattage and has a small point source. However, mercury arc lamps have a short lifetime compared to other technologies and produces light that is spectrally deficient in the red spectrum. In addition, mercury is a hazardous material that many countries would like limit the use of or ban outright. Although other bulb technologies could be substituted for the mercury vapor arc lamp, none has its efficiency and small spot size that allow for a large etendue and thus production of small high intensity projectors. Etendue is a method of measuring the system throughput. Etendue once created by a light source can only be increased. In a perfect lossless optical system, etendue is always conserved. Etendue in an optical system is limited by the element, which has the least etendue. An optical source system must have an etendue less than the limiting etendue or maximum system efficiency. Simply replacing the arc lamp bulb with a non-arc lamp will not offer a satisfactory competitive solution because of the non-point source nature of non-arc lamps limits their available etendue and they tend to produce emissions outside of visible light, which must be eliminated. To allow for substituting out mercury bulbs, the light path in a projector must have increased etendue efficiency and unwanted energy removal. Therefore, there is also a need for a solution that allows other bulb technologies to compete with mercury vapor arc lamps.

In summary, there exists a need to overcome the efficiency and other problems associated with arc lamp bulbs, particularly mercury vapor types.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar parts through the several views.

FIGS. 2A and 2B are an exemplary front and side cross-sectional schematic views of a conventional light guide interfacing to a conventional light source.

FIGS. 3A and 3B are front and side cross-sectional views of one embodiment of the invention.

FIGS. 6A-6D are exemplary cross-sections of some possible entry and exit aperture profiles of embodiments of the invention.

FIG. 7 is an exemplary block diagram of one embodiment of the invention.

FIG. 8 is an exemplary block diagram of an alternative embodiment of the invention.

DETAILED DESCRIPTION

Figure 1:
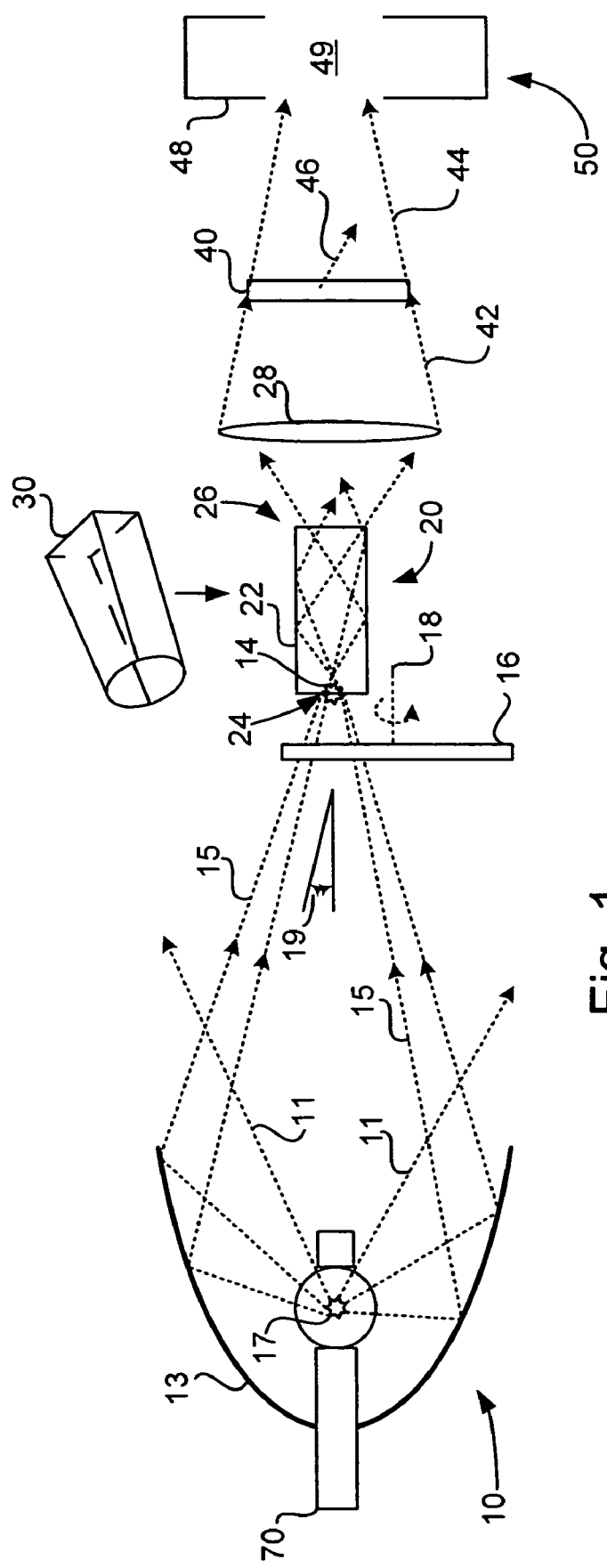
FIG. 1 is an exemplary cross-sectional schematic view of an unfolded projection system according to one embodiment of the invention.

The following is a detailed description of the best presently known modes of carrying out the inventions. This description is not to be taken in a limiting sense, but is made merely for illustrating the general principles of the invention. It is noted that detailed discussions of projection systems components that are not pertinent to the present invention have been omitted for the sake of simplicity. The present invention is also applicable to a wide range of display technologies and presentation systems, including those presently being developed or yet to be developed. For example, although various exemplary projection systems are described below with reference to digital micro-mirror projectors, other types of spatial light modulators (SLMs) such as magnetorehological, diffractive, transmissive, etc. are equally applicable to the present invention.

The optical devices in embodiments of the present invention are applicable to a broad range of optical devices technologies and can be fabricated from a variety of optic materials. The following description discusses several embodiments of the optical devices of the present invention as implemented in reflective embodiments, since the majority of currently available optical devices are fabricated in reflective optics and the most commonly encountered applications of the present invention will involve reflective optics. Nevertheless, the present invention may also advantageously be employed in refractive, diffractive, and combinations of reflective and the aforementioned technologies. Accordingly, the present invention is not intended to be limited to those devices fabricated in reflective optics, but will include those devices fabricated, alone or in combination, in one or more of the available optic methods and technologies available to those skilled in the art including those not listed.

It should be noted that the drawings are not true to scale. Further, various parts of the optical elements have not been drawn to scale. Certain dimensions have been exaggerated in relation to other dimensions in order to provide a clearer illustration and understanding of the present invention.

In addition, although the embodiments illustrated herein are shown in two-dimensional views with various regions having length and width, it should be clearly understood that these regions are illustrations of only a cross-sectional portion of a device that is actually a three-dimensional structure. Accordingly, these regions will have three dimensions, including length, width, and depth, when fabricated as an actual device. Although, some three dimensional structures will be transverse rotations of the two dimensional structures shown, other three dimension structures having similar longitudinal cross-sectional portions exist, such as transverse rectangular shapes (e.g. extending the transverse cross-section linearly in depth or width dimensions), and are to be viewed as falling within the scope and spirit of the invention.

Further, although different embodiments are shown in cross-section along the longitudinal axis, different sections of the embodiment may have transverse cross-sectional profiles. For instance, for an integrated morphing light guide (MLG) and integrating rod, the MLG may have a morphing circular to rectangular transverse cross-section and the integrating rod may have a uniform rectangular transverse cross-section. The present embodiments illustrated are meant to cover the various possible transverse cross-sectional combinations possible and still remain within the scope and spirit of the invention.

Moreover, while the present invention is illustrated by embodiments directed to projector devices, it is not intended that these illustrations be a limitation on the scope or applicability of the present invention. It is not intended that the projector devices of the present invention be limited to the physical structures illustrated. These structures are included to demonstrate the utility and application of the present invention to presently preferred and alternative embodiments.

FIG. 1 is a schematic diagram of an unfolded optical display system found in a projection device incorporating at least one aspect of the invention. The optical display system includes a light source 10, a color wheel 16, a morphing light guide 30 as a spatial homogenizer 20, an SLM 40, and imaging optics 50. The morphing light guide 30 is disposed in front of, integrated with, or in place of an integrating rod 22 to create the spatial homogenizer 20. The light source 10 includes an elliptical reflector 13 and a bulb 70. The bulb 70 is generally a mercury-vapor arc lamp that produces a small fireball 17 at a first focal point (object point) of the ellipse of preferably white light that is imaged (focused) to a second focal point to create an image point 14 at the entrance of the MLG 30. The light source 10 creates both a set of focused light rays 15 that converge to the image point 14 and stray light rays 11 that do not converge to the image point 14. The color wheel 16 is rotated about a color wheel axis 18 to present one or more color sections (such as red-green-blue, red-green-blue-white, or red-green-blue-red-green-blue, to name a few) in order to convert the wide band light spectrum (white light) from light source 10 to a temporal sequence of colors. Mercury lamps, however, are usually deficient in the amount of red spectrum produced, thus creating off-white light that must be corrected by the color wheel or other mechanism. The color wheel 16 is one of a number of gamut generators 56 (see FIG. 2) that can produce a sequence of colors. The spatial homogenizer 20 with morphing light guide 30 is used to create a uniform intensity in the light rays emitted from the cross-sectional profile at exit 26.

The focused light at the image point 14 enters the spatial homogenizer 20 at entry 24 at a first angle 19 (usually called a cone half-angle) based on the optical design of the elliptical mirror. Typically, a conventional integrating rod 22 used as spatial homogenizer 20 has a rectangular transverse cross-section profile (as opposed to the longitudinal cross-section shown) to convert the light into a rectangular image for focusing on a correspondingly ratioed rectangular shaped SLM 40. Most integrating rods 22 are constructed as hollow rectangular boxes and coated inside with a highly reflective coating to allowing incoming light rays to reflect off the surfaces. This reflection spatially homogenizes the light thereby evenly distributing it over the transverse cross-sectional exit aperture to create a uniform intensity in the cross-section of light rays leaving the exit 26 of the integrating rod 22. Generally, for conventional rectangular integrating rods 22, the light exits from exit 26 at first angle 19. The light rays leaving the integrating rod are then imaged into a set of uniform light rays 42 with a condensing lens 28 or other optics to fill the area occupied by the active elements of the SLM 40. This imaging is performed by having the height and width of the integrating rod 22 matched in ratio to the dimensions of the SLM 40. The reflected light 44 leaving the SLM 40 is then optically coupled into imaging optics 50 such that the reflected light 44 is substantially captured in the imaging optics aperture 49 of projection optics 48. Deflected light 46 is directed away from the imaging optics aperture 49 so it is not projected. Although the SLM 40 is described as reflective, the optical path shown is unfolded for ease of understanding. An actual design would require the light to reflect off SLM 40 at compound angles.

One problem with conventional projection systems is that the light source 10 must have a practically ideal point source or plasma fireball 17 in order for most of the light from the light source 10 to enter the entry 24 of the conventional integrating rod 22. If the projection system is not designed efficiently, much of the light from the bulb 70 never reaches the imaging optics aperture 49.

Geometric etendue (also known as geometric extent) is defined as the ability of an optical system to accept light. The etendue is a function of the area of the source and the solid angle into which it propagates. Etendue is a limiting function of system throughput. Etendue is a constant of the system and is limited by the least optimized segment of the entire optical system. Etendue can only be conserved, thus it is important that all ancillary optics within the system collects and propagates the maximum number of photons available. Etendue is expressed as:

$$E = \pi A \sin^2(\theta_{1/2}) \tag{Equation 1}$$

where E=etendue, A=cross-sectional area of beam or aperture, $\theta_{1/2}$ is the half angle of the beam (such as first angle 19). If light is to pass through a system without loss, the etendue must remain the same or increase for each element or light will be lost.

The following embodiments allow for the collection of more light from the light source 10, and route it so that the light is optimally used within the optic system. The embodiments increase the efficiency of digital projectors by collecting more light at the focus of the lamp by using non-imaging optics to create the morphing light guide (MLG) 30 to collect and at least partially spatial homogenize the light. This MLG 30 can be placed before the integrating rod 22, integrated therewith, or in place of it depending on a desired design of MLG 30. The light collection by MLG 30 increases the amount of screen lumens a digital projector or other display device can deliver for a particular light source 10. More luminous flux from the new spatial homogenizer 20 (i.e. incorporating the morphing light guide) is produced without having to change the magnification in the illumination system or growing the overall package size. For instance, projectors using the invention may have a total system efficiency gain of greater than 15% with minor changes to the optical system. This increased efficiency allows for a brighter image, less power consumption, or use of a different light source 10.

One exemplary embodiment of a morphing light guide (MLG) 30 has a rotationally symmetric (in the transverse as opposed to longitudinal direction) entry or entrance aperture to capture most of the light at the image point of an imaging digital projector lamp and a rectangular exit aperture having the same cross sectional area as the entrance aperture. This embodiment that uses a rotationally symmetric entry profile is defined herein as a "Potekev" light guide 80 (see FIGS. 3A-3B and FIGS. 9A-9B). The MLG 30 can incorporate the spatial homogenizer's function or the MLG 30 can be combined in series before a conventional integrating rod 22 or amalgamated with it.

It should be understood that the light at the image point of the imaging light source is not an actual point image but rather an extended area image typically about 6 mm in diameter having a non-spherical three-dimensional volume with a practically pointed Gaussian type intensity profile. The MLG 30 entrance aperture is located at or near the focus (image point) of the lamp and directs the light towards the exit aperture of the MLG 30. The exit aperture of the MLG 30 is preferably but optionally designed so that its geometric shape is the same shape as the height and width dimensions of spatial light modulator 40. For instance, substantially all of the light exiting from the MLG 30 is coupled so that at the exit of the MLG 30 the light has a uniform intensity profile across its cross-sectional profile when imaged on the SLM 40. Generally, the longitudinal length and transverse shape parameters of the MLG 30 are adjusted to maximize the light capture from the lamp, minimize optical length along the optical axis for small packaging applications, and optionally efficiently couple this light to an integrating rod for further homogenization. For example, the transverse shape can be circular, rectangular, square, octagonal, or otherwise. If non-circular at the exit of the MLG and the length is sufficient, the function of the integrating rod and the MLG can be combined into a single integrated unit. In addition, a particular embodiment may have one or more sections of morphing light guides thus allowing for further design flexibility (See FIG. 10).

Various embodiments of the MLG 30 may also be made of a refractive material such as clear glass, polymer, clear polycarbonate, clear plastic, or other substantially optically transparent material. The embodiments may be hollow or solid. A hollow embodiment may be coated on the inside with a highly reflective metal such as silver, enhanced aluminum, rhodium, or preferably a high reflectivity dielectric stack. A solid embodiment may have a reflective or dielectric coating on the outside to improve internal reflectance.

The luminous flux gain achieved over a conventional design is possible because various embodiments of the MLG 30 collect and couple more of the light from the light source into the optical path of the projection optics. It should be understood that for an exemplary elliptical mirror, the plasma fireball has the shape of a hot dog or cylinder. This plasma cylinder is an extended source in volume space and is thus far from an ideal point source image. An actual point source image could be imaged to a point source limited only by the aberrations and diffraction of the imaging lens. It should be understood that such an extended plasma cylinder source is placed at the first focus (object point) of the elliptical mirror. The center of this plasma cylinder is generally collocated with the object point of the elliptical mirror. This placement results in the ends of the plasma cylinder being located short and long of the focus and thus the ends are imaged to conjugate points that are long and short of the second focus (image point) of the elliptical reflector. These two points are also imaged with larger and smaller magnifications than the center of the plasma cylinder. This aberrational result creates a final image of the plasma cylinder that has the three dimensional shape of a second of a cone. The rays at one plane that is called the second focus (image point) of the elliptical reflector will have a large caustic of rays with a large spatial and range of angular ray orientations. Conventionally, the image point is located at the entrance of the conventional rectangular integrating rod. However, because of physical aberrations from both the cylinder of light and the ellipse, not all of the light is captured by a finite sized integrating rod aperture. In fact, simulation shows that a significant portion of the light is not coupled into the conventional integrating rod 22 but reflected back or not coupled therein. For example, the conventional integrating rod 22 might only capture 60% of the energy.

For instance, FIG. 2A illustrates an iso-flux contour map (quasi-Lorentzian intensity profile) at the input aperture of a conventional integrating rod 22. FIG. 2B is a longitudinal cross-sectional view of the integrating rod 22 as it is aligned with the iso-flux contour map. The rectangular image on the map in FIG. 2A illustrates the entry aperture's geometric shape in relation to the iso-flux contour map. Note that a significant portion of the light does not enter the integrating rod 22 and thus is lost as uncollected light 23.

FIGS. 3A and 3B are front and side views, respectively, of the MLG 30 illustrated in FIG. 1 along with the iso-contour map of a conventional elliptical light source. The MLG 30 has an entry aperture shaped to match the iso-flux contour map to allow for the collection of this previously uncollected light 23. FIG. 3A shows the outline of the entry of rectangular conventional integrating rod 22 and this outline also represents the exit profile 26 of MLG 30. Also shown in FIG. 3A is the outline of the rotationally symmetric entry 24 of MLG 30. While both the conventional integrating rod 22 and the MLG 30 have a portion of light that is left uncollected (uncollected light 23 for integrating rod 22 and uncollected portion 25 for MLG 30), the MLG 30 with the circular cross section allows for more photons to be collected by encompassing more of a higher intensity profile than the rectangular entry of integrating rod 22.

FIG. 3B illustrates a side longitudinal cross-section view of the MLG 30. The body preferably, but optionally, extends a length L sufficient to allow for the spatial harmonization of the light. That is, the output intensity of the transverse cross-sectional profile of the light will be substantially uniform. The inset shows the front view without the iso-flux contour map to show how the circular cross-section of the entry profile is morphed to a rectangular cross-section exit profile while maintaining substantially the same transverse cross-sectional area along length L. In so doing, the etendue is preserved.

With the image point of the light source positioned substantially near the entry aperture of the MLG 30, the embodiments of the MLG 30 collect more light from the light source. This light is then coupled to the rest of the light engine thereby enabling a digital projector to deliver more light or lumens to the screen for a given wattage of a particular type of bulb. Empirical modeling of the MLG 30 demonstrates a substantial improvement in the luminous flux at the exit of the spatial harmonizer using this invention compared to a conventional integrating rod 22 alone.

There are several methods of manufacturing MLG 30 embodiments: One method is to form a rough hollow shape in a cylinder and then single point diamond turning (SPDT) the hollow shape within the cylinder. Another approach is to create two parts that are electroformed with a seam along the optical axis. Alternatively, the two parts can be electroformed as two parts with a seam perpendicular (transverse) to the optical (longitudinal) axis. In addition, various casting methods are known in the art and used for quality optical surfaces.

While the MLG 30 can be made from solid optical material such as glass, it is possible that the heat from the mercury arc lamp if not properly controlled can solarize and degrade the transmission properties of some solid optical materials such as polymer. However, in some applications, the choice of optical material may not be affected by the energy of the lamp, such as in low intensity applications. Alternatively, one embodiment of an MLG 30 is to make it from a reflective hollow shape with a high reflection enhanced metal or dielectric high reflection coating. More information about the manufacturing steps is detailed in FIG. 11.

Figure 4:
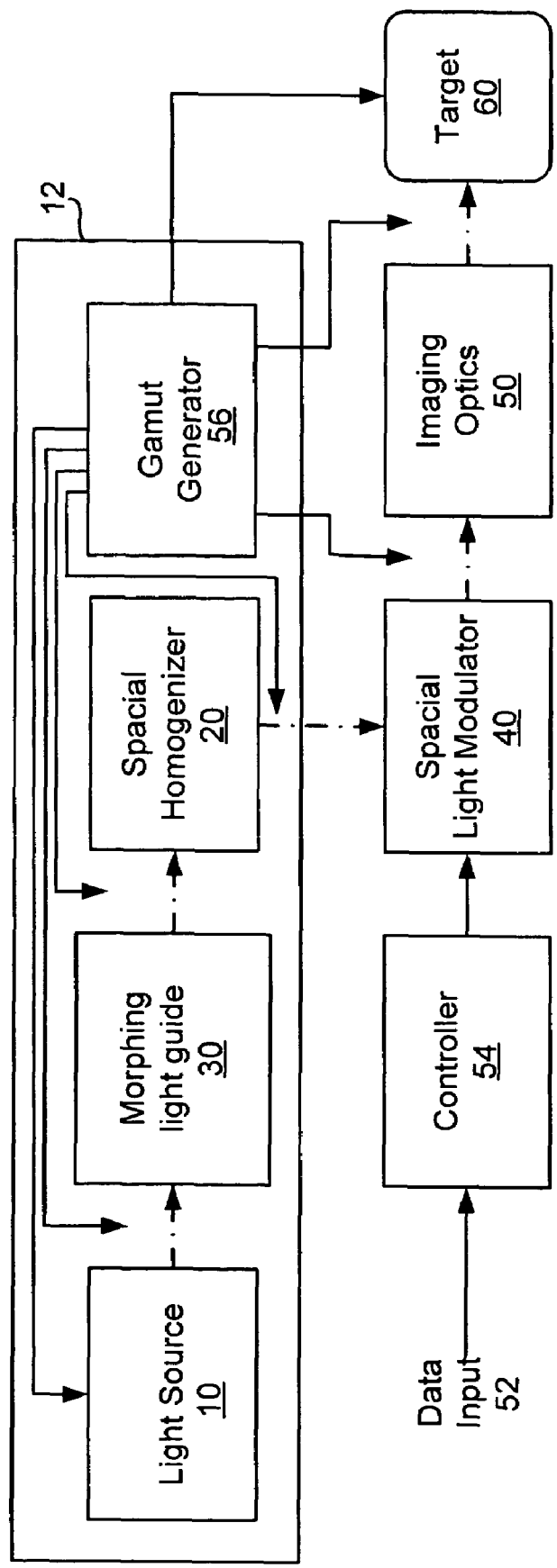
FIG. 4 is an exemplary block diagram of a projection system that includes an embodiment of the invention.

FIG. 4 is a block diagram of an embodiment of an optical imaging system that incorporates the invention. The light path through the optical system is illustrated with dot-dash lines. Other signals are shown as solid lines. A light generator 12 includes a light source 10, a morphing light guide (MLG) 30, an optional spatial homogenizer 20 and a gamut generator 56 (for creating color). The light source 10 preferably includes an imaging lens that is reflective, refractive, diffractive, or combinations thereof. The gamut generator 56 for creating color can be optionally incorporated at different points in the light generator or even anywhere in the optical path before the projected light enters the human eye. For instance, the gamut generator 56 can be integrated into the light source 10; it may be placed after the light source 10, the morphing light guide 30, or the spatial homogenizer 20.

The light from the light generator 12 is optically coupled to the spatial light modulator 40. A controller 54 that receives analog or digital input from a video or picture source data input 52 controls the SLM 40. The light from the SLM 40 is then optically coupled to the imaging optics 50 for projection or imaging on a target 60. Such targets 60 include a front or rear projection screen, a wall, a translucent screen, or other display device, such as an active screen. An active screen allows for optical amplification or contrast enhancement of the image projected on it. In addition, the gamut generator 56 can be incorporated after the spatial light modulator 40, the imaging optics 50 or even incorporated into the target 60, such as with an active screen.

FIGS. 5A-5D are exemplary embodiments of just a few of the possible light sources that create an image point 14 that is formed substantial at the entry aperture of the morphing light guide 30.

Figure 5D:
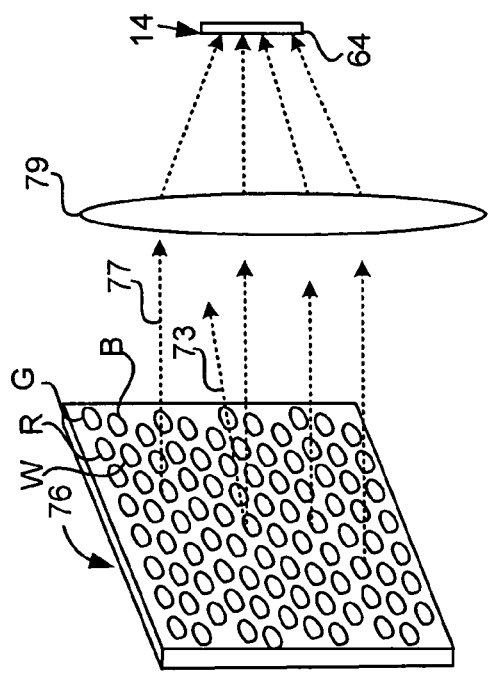
FIGS. 5A-5D are exemplary embodiments of various light sources that can be used with the embodiments of the invention.
Figure 5C:
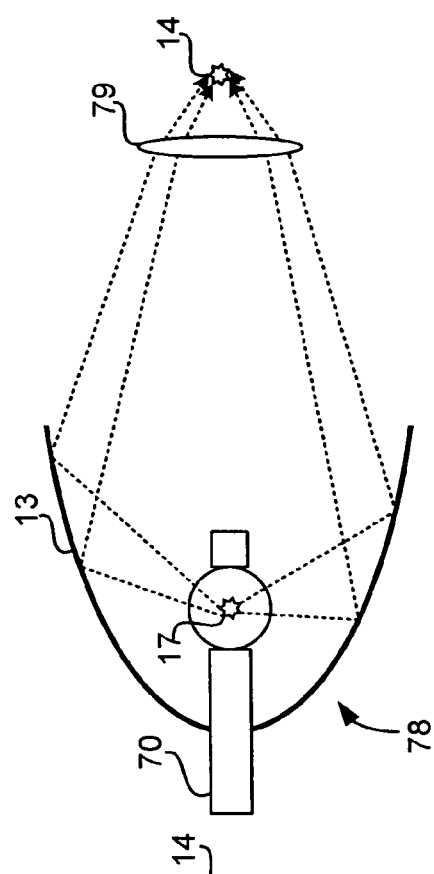
Figure 5A:
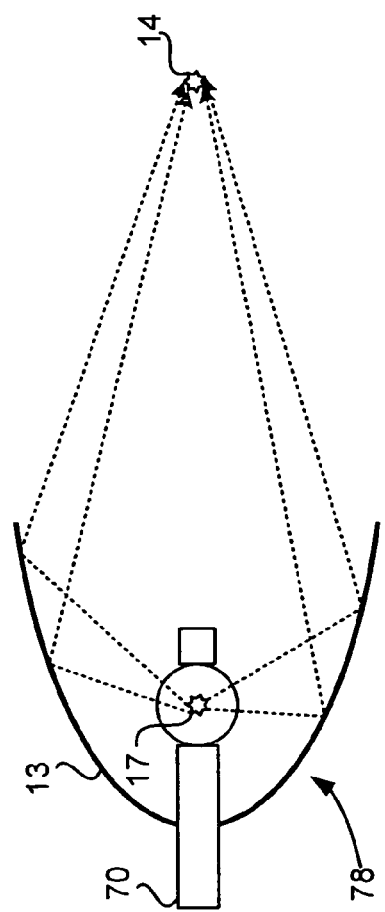

FIG. 5A is an elliptical light source 78 with a bulb 70 and a partial elliptical reflector 13. The shape of the partial elliptical reflector 13 is such that light from a first focal point of the ellipse, such as at the location of fireball 17, is reflected and forms an image point 14 at the second focal point of the ellipse. The ellipse can be shaped to form the image point close to the exit aperture of the mirror at the expense of more optical precision required in the manufacturing of the mirror. Less precision is required if the image point 14 is located further from the exit aperture of the elliptical mirror, however the length of the optical path becomes greater. Another benefit of locating the image point 14 further from the elliptical mirror exit is that the cone half-angle of convergence in forming the image point 14 is less than when the image point 14 is formed closer to the exit aperture. This results in not only less distortion of the image point but also helps to couple the image point 14 into the MLG 30. Although the image point 14 is shown as a round fireball, the actual fireball of many light sources is not a perfect point source. Thus, the resulting image formed at image point 14 will often be only an approximation of the fireball 17 at the first focal point and will be distorted. This distorted image is not fully coupled into the integrating rod with conventional projector designs, thus creating for an inefficient light source.

Figure 5B:
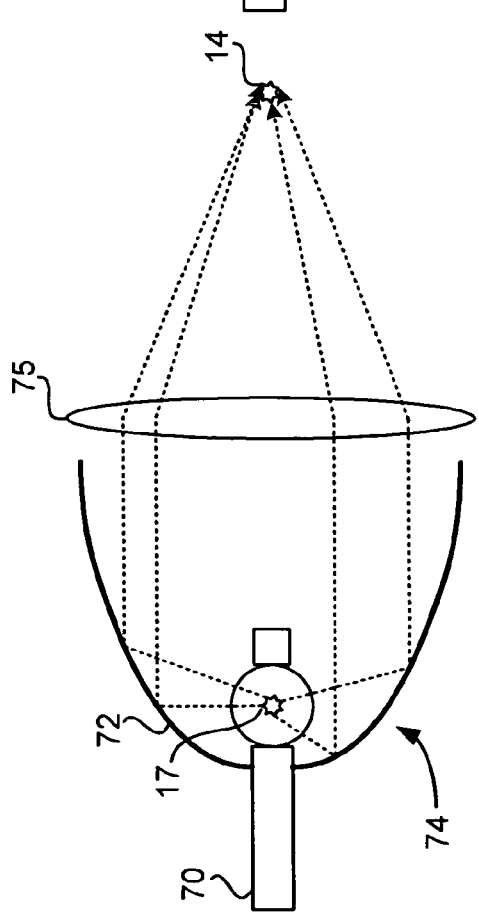

Another conventional light source is shown in FIG. 5B. In this embodiment, a parabolic light source 74 has a bulb 70 that forms a fireball 17 at a focus of a parabola 72. The light leaving the focus of the parabola is reflected off the parabola to create a substantially collimated (parallel) light path that is then imaged to an image point by a condensing lens 75. This approach allows for more flexibility in designing the length of the light path (and hence the half-angle) because the optics of condensing lens 75 forms the image point 14, thus the reflector can be made with less tolerance. This approach is generally less efficient that the elliptical mirror and adds an additional element, thus increasing the weight, length, and cost of the light source.

FIG. 5C is an embodiment of a modified elliptical light source 78 that combines an elliptical reflector 13 with a reducing lens 79 to create a shorter optical path than that of the elliptical reflector 13 alone. This approach allows for less tolerance in manufacturing the elliptical reflector 13 by allowing it to have a small angle of convergence (half-angle cone). The reducing lens 79 is used to increase the angle of convergence of the image point 14 thus also reducing the path length of the light source.

One advantage of an optical path with the morphing light guide 30 is that it can be designed to encompass several different fireball sizes thus allowing for more tolerance in alignment of the imaging light source and interoperability of different light sources. A conventional projector design is generally limited to a single light source having a well-defined fireball imaged to a particular image point. However, a projection or other imaging system using the morphing light guide 30 can allow for different types of light sources than conventional mercury arc lights. For instance, light sources such Xenon have longer operating lives and are whiter than mercury bulbs but may not have as much light output for a given wattage and generally do not form as small a point source. By incorporating the morphing light guide 30 and imaging the Xenon fireball at an image point in front of the entry aperture of the MLG 30, the efficiency of the Xenon light source is improved, thus allowing for a mercury-free light source solution. Thus, the bulb 70 in any of the embodiments may be replaced with a non-mercury light source such as Xenon, Sodium, or Halogen based lights to just name a few. In fact, several different light sources that are non-point sources may be used.

For instance, as shown in FIG. 5D, solid state light sources such as a light array 76 having multiple red (R), green (G), and blue (B) elements many be used. Optionally, white (W) elements can be added to increase the contrast. The light array 76 can be implemented with solid-state light sources such as light emitting diodes or laser diodes. Light that is emitted from the array either orthogonally to the plane of the array (light beam 77 as with collimated laser diodes) or divergent from the axis normal to the surface of the array (divergent light beam 73 as with LEDs) is focused by a reducing lens 79 to an image 64. Image 64 is not an actual point source but equivalent to image point 14, although it may have a different geometric shape. Optionally, a solid-state LED array with an array of collimating lenses can be substituted for collimated laser diodes. However, because the MLG 30 collects light over a range of incoming angles within a specified input aperture geometric shape and exits the light at a known maximum half-angle of divergence equal to maximum of the incoming angle, substantially all the light from the light array 76 is optically coupled to the optical path. In this example, MLG 30 would have a rectangular entry aperture cross-section that matches the shape of the light source. Its exit aperture would have a different rectangular cross-section that matches the SLM's shape or the desire projection pattern. The MLG 30 would morph its shape from the entry aperture to the different exit aperture while maintaining a consistent cross-sectional area. Further, by using a light array as shown, the gamut generator 56 (FIG. 4) is incorporated into the light source, thus eliminating an expensive color sequencer such as a color wheel 16 (FIG. 1), since the different color sources may be energized sequentially.

Therefore, the geometric shapes of the input and output apertures of MLG 30 depend upon the specific geometries of the light source, the spatial light modulator, and the desired projected pattern. FIGS. 6A-6B illustrate a few of the many possible shapes these apertures can assume while maintaining the same cross-sectional area. For example, FIG. 6A illustrates a circle 90 that is a rotationally symmetric shape generally used on the MLG 30 input aperture to match the iso-flux profile of conventional light sources. FIG. 6B is a 4:3 shape 91 has an aspect ratio rectangular profile that has the same area as the circle 90 shown in FIG. 6A. This 4:3 shape 91 in FIG. 5B can be used on the exit aperture of MLG 30 and used to image the exiting photons on an SLM 40 used to project the image. This 4:3 shape 91 could also be used as an entry aperture on a MLG 30 that morphs a 4:3 image into a 16:9 rectangular shape 92 (as shown in FIG. 6C) that is conventionally used in HDTV formatted images. This would minimize the amount of overfill (the light not used by the SLM 40). Thus, one embodiment of the MLG 30 could be implemented with a 4:3 input aperture and a 16:9 exit aperture to conserve light that is imaged onto the SLM 40 to create an HDTV image.

FIG. 6D is an example of an aperture profile that is a trapezoidal shape 93. In FIG. 1, the projection system is shown in an unfolded light path. However, many projection systems are folded, meaning that the light entering the SLM comes from an angle. This means that the image from the end of the MLG 30 if rectangular could be imaged on the SLM as a trapezoid (keystoned). This results in a portion of SLM light that overfills the SLM. A corresponding counter trapezoid shape 93 exit aperture such as shown in Fig 5D could be used to compensate and create a rectangular image on the SLM 40 and thus prevent or minimize the overfill, thus further conserving precious photons.

FIG. 7 is a block diagram of the MLG 30. It has an entry aperture 24, a morphing body 27, and an exit aperture 26. The entry aperture 24 is shaped to match a pattern of light distribution, such as the iso-contour map or the shape of the light source. The entry aperture 24 has a first area, which for a circle would be $\pi(radius)^2$ or for a rectangle, the width times the height. The exit aperture 26 is shaped to match a different pattern that is to be imaged or projected by the SLM. The exit aperture 26 has a second area that is substantially equal to the first area. The morphing body 27 is a body that maintains a substantially consistent cross-sectional area extending from the entry aperture 24 to the exit aperture 26. In other words, the morphing body 27 has a consistent transverse cross-sectional area extending from an entry aperture 24 to an exit aperture 26, the entry 24 and exit 26 apertures having different geometric shapes yet substantially the same area. By keeping the area consistent, the half-angle (first angle 19 of FIG. 1) of the light and thus the etendue is preserved (less any absorption losses). A particular morphing light guide, defined herein as the Potekev light guide 80, has a rotationally symmetric entrance aperture, a rectangular exit aperture, and a body that morphs its shape from the entrance aperture to the exit aperture while maintaining a consistent cross-sectional area.

In other words, the MLG 30 creates an etendue preserving body having a substantially consistent cross-sectional area extending form a first aperture with a first geometric shape to a second aperture having a different geometric shape. The first aperture accepts light having a first cone half-angle. This light is transmitted through the body within a consistent cross-sectional area while maintaining etendue. The second aperture allows the light to exit at a second cone-half angle equal to the first cone half-angle. This technique of holding the area constant ensures that maximum etendue is collected at the entry aperture while being substantially preserved at the exit aperture.

FIG. 8 illustrates a block diagram of an alternative embodiment of the invention in the form of a compound morphing light guide (CMLG) 33. While the morphing body of FIG. 3B can be extended a length L to create a spatially homogenized light, alternatively, a first morphing section 32 such as MLG 30 can be combined with a second morphing section 31 or an integrating rod 22 to create a more uniform light distribution. This technique allows for the modification of exiting light systems by adding a MLG 30 before the integrating rod 22. The exit aperture 26 of the MLG 30 is generally shaped to match the entry aperture of the integrating rod 22 to maintain etendue.

Figure 9B:
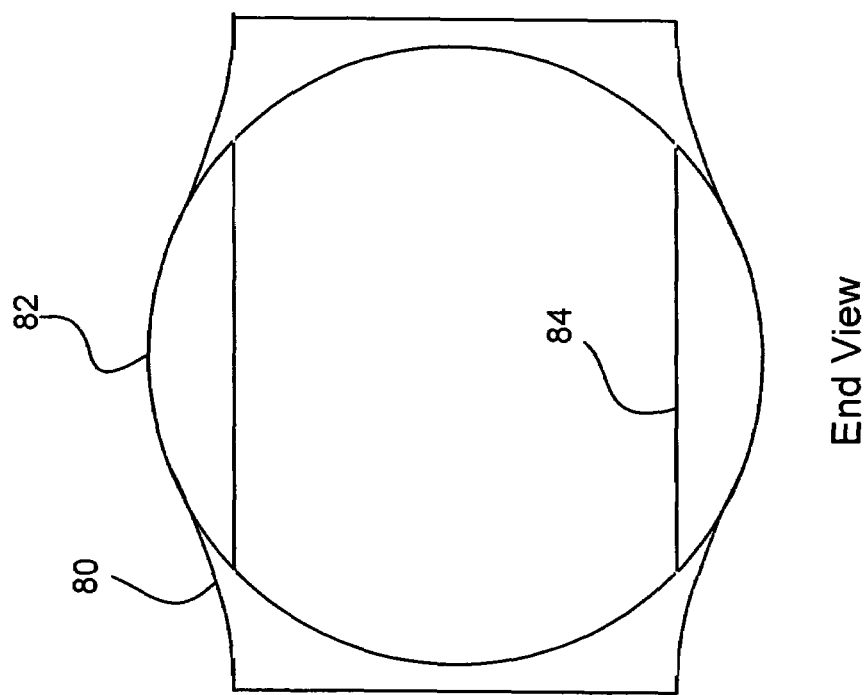
FIGS. 9A and 9B are a perspective and end views illustrating one embodiment of the invention.
Figure 9A:
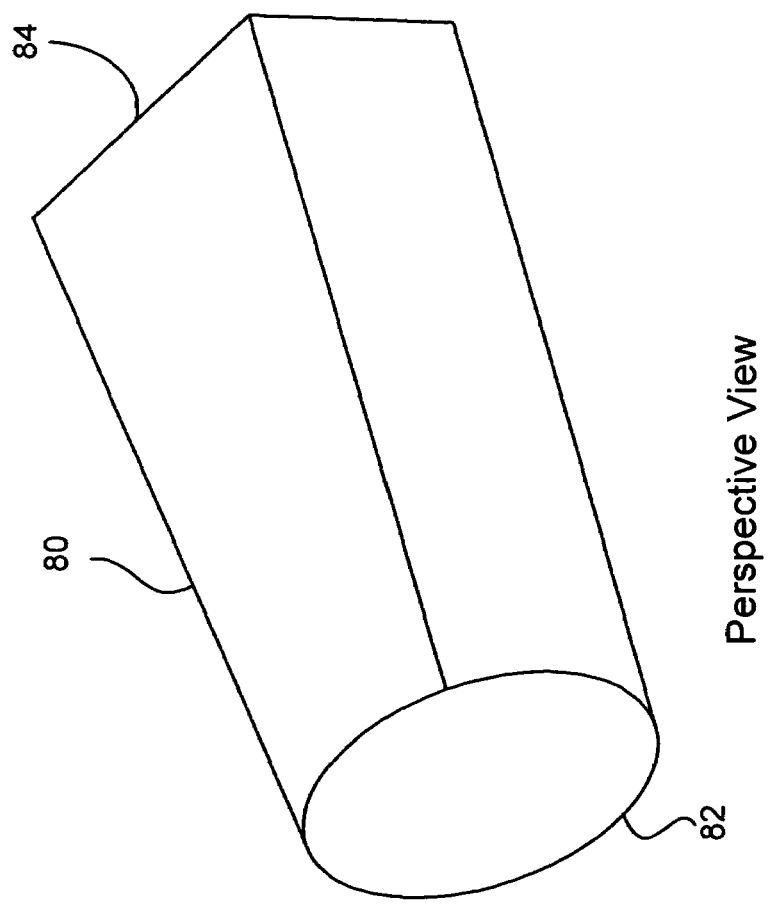

FIGS. 9A and 9B are a perspective and end view, respectively, of a Potekev light guide 80 as one embodiment of the invention. As previously described, a Potekev light guide 80 has a circular or rotationally symmetric entry aperture 82 and a rectangular cross-sectional exit aperture 84. The Potekev light guide 80 is generally implemented as a molded solid optical glass with a reflective coating or as a hollow reflecting tunnel device. The length of the Potekev light guide 80 is chosen such that the spatial homogenization is at least partially accomplished along with the etendue preservation. Due to the circular distribution of most light sources, the Potekev light guide collects more light than a rectangular integrating rod with an entry aperture of the same cross-sectional area as the circular aperture. Due to the etendue preserving characteristic, the collected light becomes useful light that the rest of the illumination optics in a projection system can use to deliver the illumination plane of interest. The body of the tunnel extends for a certain length with its rectangular cross-section. The rectangular portion of the body redistributes the circular pattern at the tunnel entrance into a relatively homogeneous spatial distribution (substantially uniform intensity) at the tunnel exit. This embodiment allows for a cost effective and optically effective solution to increasing light efficiency in conventional projector designs.

Figure 10:
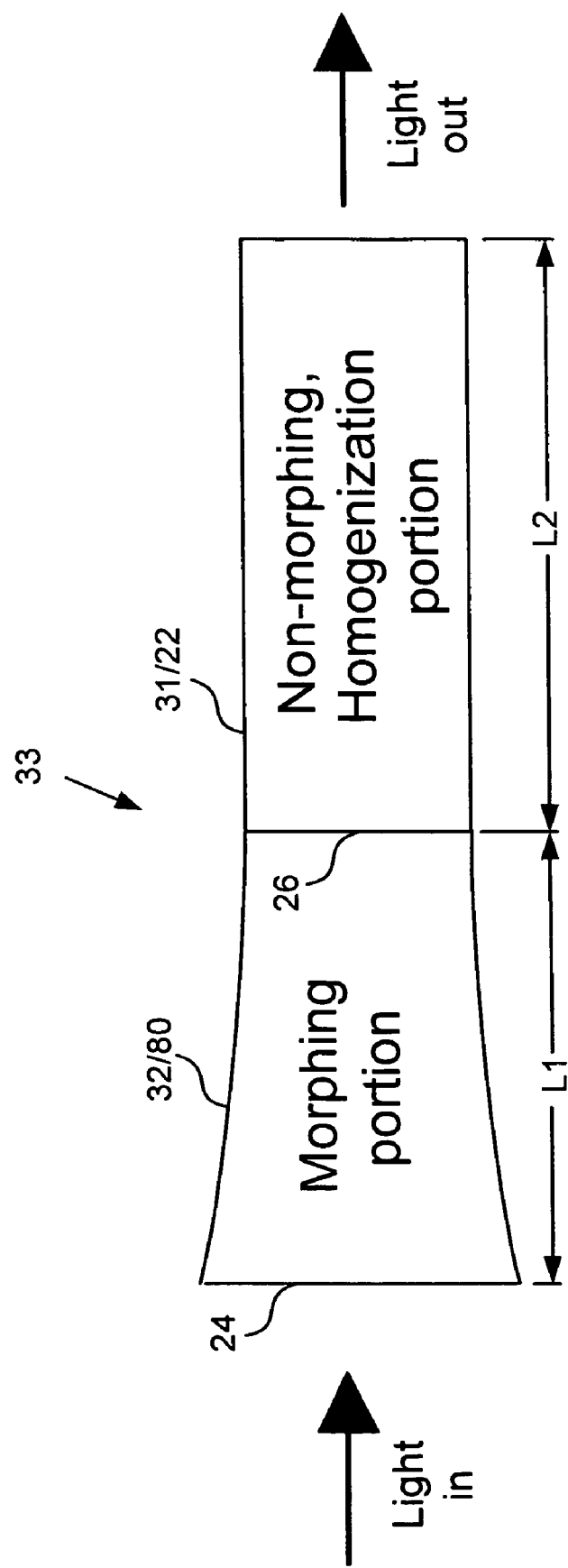
FIG. 10 is a cross-sectional view of an alternative embodiment of the invention.

FIG. 10 illustrates an alternative embodiment of a morphing light guide. In this embodiment of a CMLG 33, a first morphing section 32, such as using a Potekev light guide 80, can be kept to a length L1 to convert the input light from a first cross-sectional profile at entry 24 to a second cross-sectional profile that matches a non-morphing second homogenous portion 31, such as a conventional integrating rod 22. This technique allows for the spatial distribution of the light flux at the exit aperture 26 of the first morphing section 32 to be further homogenized by either bonding it to a conventional integrating rod or by extending the rectangular section of first morphing section 32 by a length L2 as shown.

By way of example, an exemplary projection system will be described. A conventional light source 10 has a typical exit cone half-angle of about 28 degrees. In this exemplary system, the elliptical mirror 13 has a diameter of about 32 mm. The integrating rod 22 entry and exit apertures have a width of about 6.25 mm and a height of 4.9 mm. The MLG 30 has a circular aperture with a radius of 3.122 mm. MLG 30 is generally made of solid clear optical glass dielectric total internal reflection body or with a reflective coating on the outside. The integrating rod 22 is generally hollow with high reflectivity dielectric coated surfaces. In this embodiment, the MLG 30 entry aperture is rotationally symmetrical and the integrating rod 22 has a rectangular shaped transverse cross-sectional profile. The integrating rod 22 has an entry aperture that is optically coupled to a matching rectangular exit aperture 26 of the MLG 30. The integrating rod 22 not only helps to spatially harmonize the light but also optionally converts the light exiting from the MLG 30 to a geometric cross-sectional shape, preferably rectangular, that matches the cross-sectional profile of the spatial light modular located further down the optical system (for example, see FIG. 4).

The integrating rod 22 is optionally made of an optical material such as clear glass, clear polycarbonate, or clear plastic. The MLG 30 may be hollow (reflective) or solid (refractive). A hollow MLG 30 may be coated on the inside with a high reflectivity metal such as silver, enhanced aluminum, rhodium, or a multilayer dielectric high reflector to provide a reflective layer.

The integrating rod 22 and the MLG 30 may be formed integrally to form an amalgamated light guide or fabricated separately and secured together. The cross-section of the integrating rod 22 is rectangular or a combination of an even number of opposing similar angles. Preferably, the cross-section aspect ratio of the integrating rod matches the geometry of the SLM to maximize light throughput in the system and allow for symmetric magnification ratio, otherwise an anamorphic magnification ratio is required and may require more elements that increase cost and lowers efficiency. Other spatial homogenizers that can be substituted for integrating rod 22 include four sided truncated pyramidal integrating rods. When the entrance of such a pyramidal is smaller than the exit, it forms a divergent integrating rod with a flared exit aperture. The light rays leaving the divergent or flared integrating rod has smaller exit ray cone half-angles than the light entering the rod. When the entry is larger than the exit of a converging pyramid-integrating rod, the exit ray angles have a larger half-cone angle to preserve etendue. Thus, a flared integrating rod can be used to change the final area and half-angles to match a particular optical system.

The MLG 30 can be manufactured as a stand-alone part or incorporated with other portions of the light path optics to minimize cost and reduce assembly tolerance issues. Although several different manufacturing technologies exist for creating optical components, several different methods may be combined non-intuitively but advantageously to create the high efficiency desired for the MLG 30.

Figure 11:
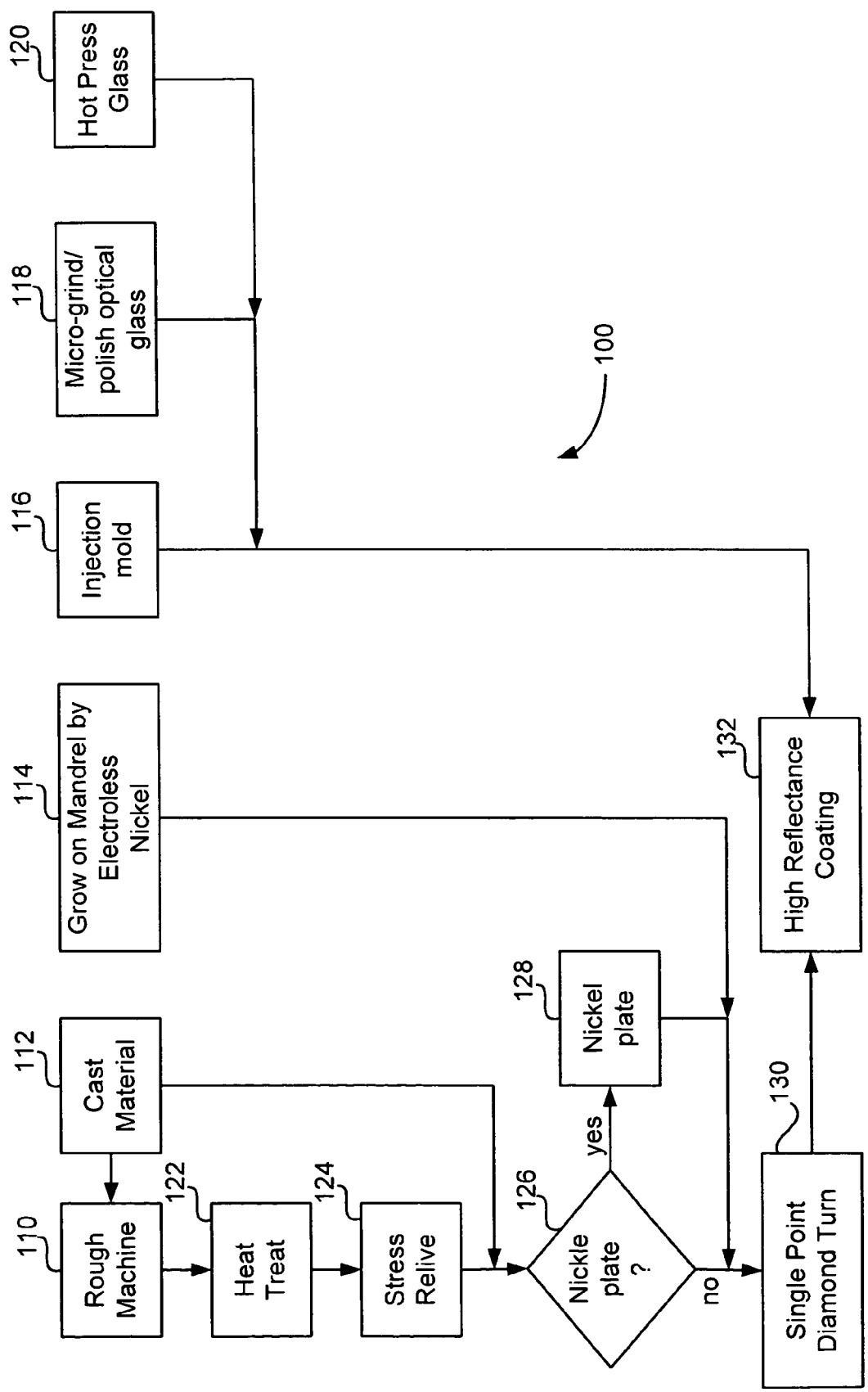
FIG. 11 is a block diagram illustrating exemplary manufacturing steps available to construct embodiments of the invention.

For instance, FIG. 11 is a flow chart representing several different combinations of manufacturing steps 100 possible to create an MLG 30 alone or in combination with other optical elements. An aluminum alloy such as 6061, 7000, or 1000 series can be rough machined (block 110) to near the desired shape and then optionally heat treated (block 122) and/or optionally stress-relieved (block 124) to a known standard such as MIL H 6088. Optionally, one could decide to nickel plate (block 126) the aluminum surface and if so plate the aluminum with nickel (block 128). Either way, the aluminum alloy part is then single-point diamond turned (SPDT) to create an optical finish (block 130). Optionally, the optical finish can be coated with a highly reflective coating (block 132) to minimize reflective losses. Optionally, rather than rough machining, a part could be fabricated by casting (block 112) a metal, ceramic, or composite to near the desired shape and then performing the other optional steps of rough machining, heat treating, stress relieving, nickel plating and then SPDT and optionally high reflective coating the optical surfaces. Another option rather than rough machining or casting is to grow the part in preferably multiple pieces, such as two halves, on a mandrel for instance with an electro-less nickel process (block 114) and then SPDT (130) and optionally coat with a high reflective material (132).

Other possible MLG 30 devices alone or in combination with other optical components can be formed of solid optical material using injection molding (block 116), micro-grinding or polishing of optical glass (block 118), or hot pressing glass (block 120). One possible high temperature plastic would be cyclic olefin polymer. Optionally, the formed optical glass can be coated with a high reflectance coating (block 132) at all angles of incidence to improve efficiency.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A morphing light guide, comprising:
a body having a consistent cross-sectional area extending from an entry aperture having a first geometric shape to an exit aperture having a different second geometric shape, wherein the body is a solid optical glass with a reflective coating or a hollow reflecting tunnel device, and wherein the entry and exit apertures have substantially the same cross-sectional area as the body.

2. A morphing light guide, comprising:
an etendue preserving body having a substantially consistent cross-sectional area extending from a first aperture having a first geometric shape to a second aperture having a different geometric shape, wherein the body is a solid optical glass with a reflective coating or a hollow reflecting tunnel device, and wherein the entry and exit apertures have substantially the same cross-sectional area as the body.

3. A morphing light guide, comprising:
an entry aperture having a first geometric shape and an entrant profile accepting photons bounded by a predefined half-angle and the entry aperture having a first geometric shape; and
an exit aperture having a second geometric shape wherein the accepted photons exit bounded by a cone having the same predefined half-angle, wherein the first geometric shape and the second geometric shape have the same cross-sectional area and wherein the morphing light guide is a solid optical glass body with a reflective coating or a hollow reflecting tunnel device, and wherein the body has substantially the same cross-sectional area as the entry and exit apertures.

4. A morphing light guide, comprising:
a rotationally symmetric entrance aperture having a first area
a rectangular exit aperture having a second area substantially equal to the first area; and
a body morphing its shape from the entrance aperture to the exit aperture while maintaining substantially a cross-sectional area equal to the first area, wherein the body is a solid optical glass with a reflective coating or a hollow reflecting tunnel device.

5. An etendue-preserving light guide, comprising:
a morphing light guide having,
    a body having a consistent cross-sectional area an entry aperture of the body having a first geometric shape, and
    an exit aperture of the body having a different second geometric shape than the entry aperture, and wherein the entry and exit apertures have substantially the same cross-sectional area as the body; and
a spatial homogenizer coupled to morphing light guide, wherein the body is a solid optical glass with a reflective coating or a hollow reflecting tunnel device.

6. The etendue-preserving light guide of claim 5 wherein the spatial homogenizer is an integrating rod.

7. The etendue-preserving light guide of claim 6 wherein the integrating rod has a flared exit aperture.

8. The etendue-preserving light guide of claim 5 wherein the morphing light guide is integrated with the spatial homogenizer.

9. The etendue-preserving light guide of claim 5 wherein the morphing light guide comprises a dielectric total internal reflection body.

10. The etendue-preserving light guide of claim 5 wherein the morphing light guide comprises a reflective optical system.

11. The etendue-preserving light guide of claim 5 wherein the spatial homogenizer comprises a reflective optical system.

12. The etendue-preserving light guide of claim 5 wherein the morphing light guide comprises a refractive optical system.

13. The etendue-preserving light guide of claim 5 wherein the spatial homogenizer comprises a refractive optical system.

14. The etendue-preserving light guide of claim 5 wherein the etendue-preserving light guide includes a first section and a second section.

15. A morphing light guide, comprising:
means for accepting light having a predetermined half angle having a first geometric shape;
means for transmitting the light while substantially maintaining the etendue of the accepted light; and
means for exiting the light having a different second geometric shape and the predetermined half angle, wherein the morphing light guide is a solid optical glass body with a reflective coating or a hollow reflecting tunnel device.

16. A light source, comprising:
a light emitter producing a wide-band light spectrum focused to an image having a first geometric shape;
a gamut generator for separating the wide-band spectrum into multiple parts; and
a morphing light guide having,
    an entry aperture having the first geometric shape coupling to the light emitter substantially at the image, and
    an exit aperture having a different geometric shape,
    wherein the morphing light guide has a consistent cross-sectional area extending from the entry aperture to the exit aperture, wherein the morphing light guide is a solid optical glass body with a reflective coating or a hollow reflecting tunnel device, and wherein the entry and exit apertures have substantially the same cross-sectional area as the body.

17. The light source of claim 16 wherein the light emitter and the gamut generator are combined into a light array.

18. The light source of claim 16 wherein the gamut generator is disposed before the entry aperture of the morphing light guide.

19. The light source of claim 16 wherein the gamut generator is disposed after the exit aperture of the morphing light guide.

20. The light source of claim 16 wherein the gamut generator is a color wheel.

21. The light source of claim 16 wherein the morphing light guide is a Potekev light guide or an amalgamated morphing light guide.

22. The light source of claim 16, further comprising:
a spatial homogenizer coupled to the exit aperture of the morphing light guide.

23. The light source of claim 22 wherein the gamut generator is disposed after the spatial homogenizer.

24. The light source of claim 16 wherein the morphing light guide has a first section and a second section.

25. An electronic device, comprising:
a controller for creating images;

a spatial light modulator receiving the images;
a light source focused to an image having a first geometric shape; and
a morphing light guide coupled to the light source having,
    an entry aperture having the first geometric shape coupling to the imaging photon concentrator at the image, and
    an exit aperture having different second geometric shape for imaging on the spatial light modulator,
wherein the morphing light guide has a consistent cross-sectional area extending from the entry aperture to the exit aperture, wherein the entry and exit apertures have substantially the same cross-sectional area as the body, and wherein the morphing light guide is a solid optical glass body with a reflective coating or a hollow reflecting tunnel device.

26. The electronic device of claim 25 wherein the electronic device is a projection device.

27. The electronic device of claim 25 wherein the electronic device is a presentation device.

28. The electronic device of claim 25, further comprising a spatial homogenizer coupled to the non-imaging concentrator.

29. The electronic device of claim 25, further comprising imaging optics coupled to the spatial light modulator.

30. The electronic device of claim 25, further comprising an imaging photon concentrator coupled to the light source and further coupled to the morphing light guide.

* * * * *

UNITED STATES PATENT AND TRADEMARK OFFICE
CERTIFICATE OF CORRECTION

| | | |
|---|---|---|
| PATENT NO. | : 7,300,164 B2 | Page 1 of 1 |
| APPLICATION NO. | : 10/928958 | |
| DATED | : November 27, 2007 | |
| INVENTOR(S) | : Franc Potekev | |

It is certified that error appears in the above-identified patent and that said Letters Patent is hereby corrected as shown below:

In column 10, line 9, delete "SD" and insert -- 5D --, therefor.

In column 13, line 40, in Claim 4, after "area" insert -- ; --.

In column 13, line 51, in Claim 5, after "area" insert -- , --.

Signed and Sealed this

Eighth Day of July, 2008

JON W. DUDAS
*Director of the United States Patent and Trademark Office*